No. 781,414. PATENTED JAN. 31, 1905.
E. G. GARNSEY.
FLOWER HOLDER.
APPLICATION FILED SEPT. 1, 1904.

Witnesses:
G. S. Noble,
C. B. Camp

Inventor,
E. Grant Garnsey
by John M. O'Connor
Attorney

No. 781,414. Patented January 31, 1905.

UNITED STATES PATENT OFFICE.

EDWIN GRANT GARNSEY, OF LAGRANGE, ILLINOIS.

FLOWER-HOLDER.

SPECIFICATION forming part of Letters Patent No. 781,414, dated January 31, 1905.

Application filed September 1, 1904. Serial No. 223,021.

*To all whom it may concern:*

Be it known that I, EDWIN GRANT GARNSEY, a citizen of the United States, residing at Lagrange, in the county of Cook and State of Illinois, have invented a certain new and useful Improvement in Flower-Holders, of which the following is a full, clear, concise, and exact description, reference being had to the accompanying drawings, forming a part of this specification.

My invention relates to holders or supports for short-stemmed flowers, and has for one of its objects the provision of a holder adapted to be placed in any suitable receptacle and provided with means whereby a free circulation of water is obtained underneath the holder or support.

Another object of my invention is the provision of means whereby the flowers may be symmetrically supported in position.

I have illustrated one embodiment of my invention in the accompanying drawings, in which like reference-numerals are used to designate like parts in the several figures.

Figure 2:
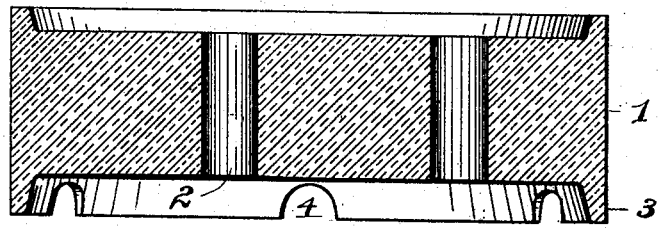
Figure 1:
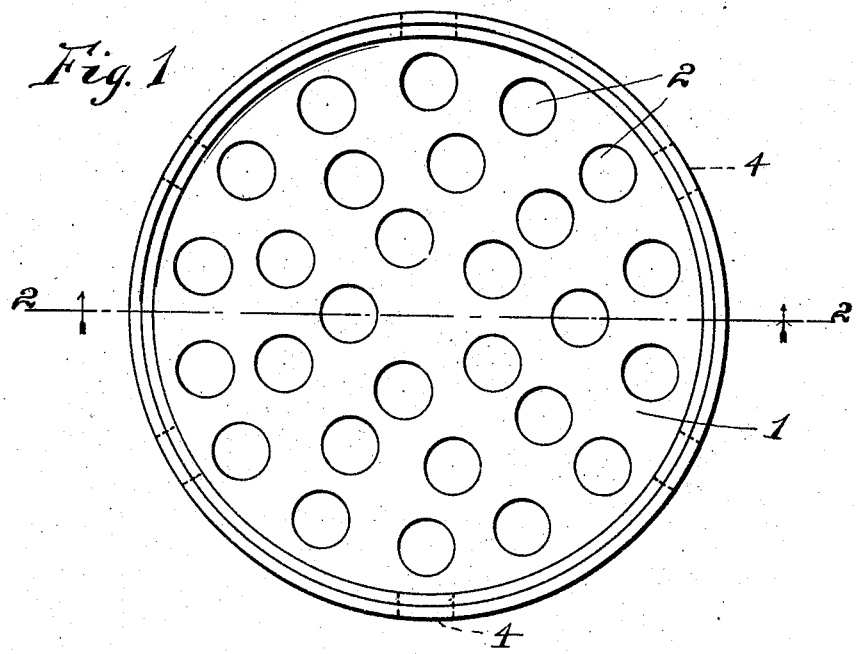
Figure 3:
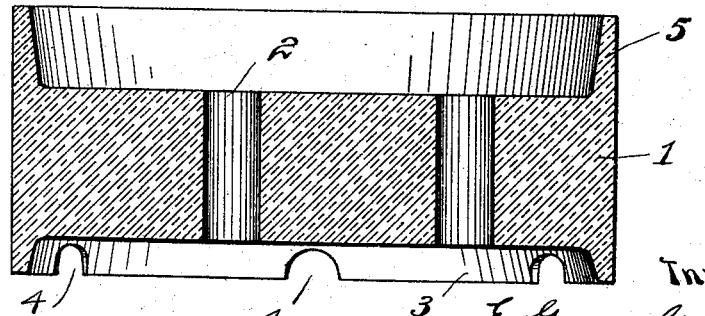

Figure 1 is a plan view of a flower-holder embodying my invention. Fig. 2 is a sectional view taken on the line 2 2 of Fig. 1. Fig. 3 is a sectional view of another form of my invention.

I am aware that supports or holders for short-stemmed flowers have been heretofore made, but said supports have not provided for symmetrically retaining the flowers in position nor for a free circulation of water underneath the holder.

In the form of my invention illustrated in the drawings I preferably provide a block 1, which may be made of any suitable material—such as glass, porcelain, pottery, or the like—40 and which may be made of any desired shape, so that one or more of said blocks may be placed in any suitable receptacle adapted to hold water for keeping the flowers fresh. The block 1 has a plurality of holes or perforations 2 formed therein, said holes or perforations being adapted to receive the stems of short flowers. The holes 2 may be arranged in any suitable manner in the block 1 and of any desired size to accommodate the particu- lar kind of flowers or ferns which are to be supported thereby.

To best support the flowers in position, the perforations or holes 2 in the block 1 should be made just large enough to accommodate the stems of the flowers and so that the stems thereof may be readily placed in position. It will be seen, therefore, that said perforations will not hold sufficient water to keep flowers in a fresh condition, and as the flowers absorb the moisture principally from the ends of the stems it is important that means be provided whereby a free circulation of water is obtained underneath the holder or block 1. This result in the present instance is accomplished by means of an annular flange 3, as shown in Figs. 2 and 3, the said flange having apertures 4 formed therein, said apertures permitting a free circulation of water at all times underneath the block 1. As will be seen, the flange 3 holds the bottom of the block 1 from engagement with the bottom of the receptacle within which said block is placed, thus permitting the stems of the flowers to extend through the perforations 2 into the body of water admitted through the openings 4 in said flange. The flowers are in this way kept as fresh as if placed in an ordinary receptacle, the perforations 2 in no manner interfering with the absorption of moisture by the ends of the stems of the flowers placed therein.

In order that the flowers may be symmetrically supported about the periphery of the block 1, an annular flange 5 is provided, said flange being adapted to support the flowers placed in the holes or perforations in the block 1 nearest said flange and being adapted to support the flowers in a position conforming to the shape or design of the block 1.

As previously stated, the block 1 may be made in any desired shape, and the flowers supported by the flange 5 will conform to the outline or design of the block 1, whereby a ragged and unkempt appearance of the outer row of flowers is avoided.

While I have described my invention with particular reference to the details of construction and while I have illustrated certain forms of embodying my invention in a practical structure, I am aware that many changes may be made in the construction herein shown and described—as, for instance, other means may be provided for supporting the block 1 out of engagement with the dish or receptacle within which said block is placed in lieu of the flange 3 and other means than the flange 5, above described, may be provided for uniformly supporting the flowers placed contiguous to the outer edge of the block 1—and I therefore claim the right to make such changes in construction as fairly fall within the spirit of my invention, and I do not wish to limit my invention further than is defined in the appended claim.

Having described my invention, what I claim as new, and desire to secure by Letters Patent, is—

A flower-holder for short-stemmed flowers comprising a block of suitable form, said block having a plurality of perforations formed therein for the flowers, and being adapted to be placed in a suitable receptacle, downwardly-extending projections carried by said block for supporting said block slightly out of engagement with said receptacle, to permit a free circulation of water underneath the block, and an upwardly-extending projection associated with said block and following the contour thereof, for uniformly supporting the flowers arranged contiguous to the outer edge of said block.

In witness whereof I have hereunto subscribed my name in the presence of two witnesses.

E. GRANT GARNSEY.

Witnesses:
DAVID B. LYMAN, Jr.,
MARGARET I. HAMILTON.